UNITED STATES PATENT OFFICE.

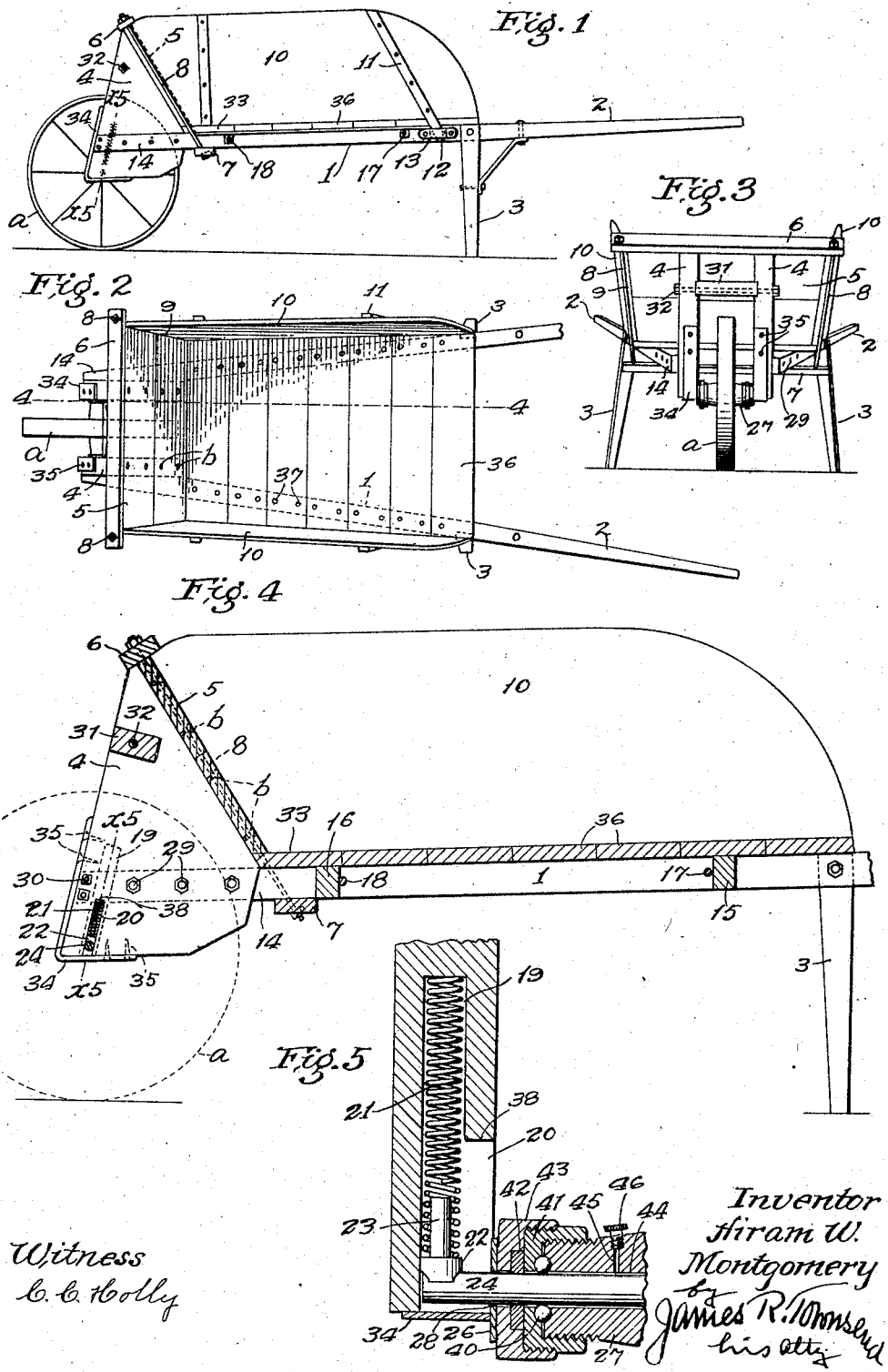

HIRAM W. MONTGOMERY, OF TOPANGA, CALIFORNIA.

WHEELBARROW.

1,300,186.      Specification of Letters Patent.      Patented Apr. 8, 1919.

Application filed September 26, 1917. Serial No. 193,616.

*To all whom it may concern:*

Be it known that I, HIRAM W. MONTGOMERY, a citizen of the United States, residing at Topanga, in the county of Los Angeles and State of California, have invented a new and useful Wheelbarrow, of which the following is a specification.

This invention relates to that type of wheelbarrow in which the operator carries a part of the load, and an object of this invention is to provide a wheelbarrow of this type in which the labor of propelling the wheelbarrow is minimized.

The reason of the great labor involved in pushing a wheelbarrow over obstacles, rough ground and the like, arises from the fact that when the wheel of a forwardly progressing wheelbarrow strikes upon an obstacle over which the wheel must travel, the momentum of the load on the wheelbarrow is practically absorbed in lifting the load over the obstacle, and an object of this invention is to avoid this absorption of the power stored up in the momentum of the load, and to apply a maximum increment of said momentum toward the forward progression of the barrow and to pass the obstacle without lifting the load.

This new wheelbarrow is provided between the axle of its supporting wheel and the frame of the wheelbarrow with a resilient supporting means of great amplitude of movement, capable of supporting the load that rests upon the wheel and allowing under full load during forward travel of the wheel an amplitude of wheel movement relative to said load, sufficiently great to surmount considerable obstructions without correspondingly elevating the load.

In practice, I find that with this new wheelbarrow, the ease with which a load is propelled over obstacles is greatly increased, and it becomes possible for an operator to propel a wheelbarrow over plowed ground with a load that would be prohibitive with any of the old forms of wheelbarrow.

A feature of the invention consists in supporting the front end of the frame by a pair of long helical springs made of light spring steel wire about $\frac{1}{4}$ inch diameter, more or less, depending upon the weight of the average load for which the barrow is intended.

In constructing a wheelbarrow of the garden wheelbarrow form I employ two $\frac{1}{8}$ inch steel wire helical compression springs about $4\frac{3}{4}$ inches long and $\frac{3}{4}$ inch diameter, so that the wheel on which the spring is supported may rise over an obstacle about 2 inches high without materially lifting the load.

Further objects of the invention are cheapness, simplicity and ease of construction by ordinary mechanics from material easily obtained.

Further objects, advantages and features of novelty may appear from the accompanying drawings, the subjoined detail description and the appended claims.

The accompanying drawing illustrates the invention in an approved form.

Figure 1 is a side elevation of a wheelbarrow constructed in accordance with this invention.

Fig. 2 is a plan of the wheelbarrow shown in Fig. 1.

Fig. 3 is a front end elevation of said wheelbarrow.

Fig. 4 is a sectional elevation on line 4—4, Fig. 2, the rim of the wheel being indicated by a dotted line.

Fig. 5 is a fragmental sectional elevation on line $x^5$—$x^5$, Figs. 1 and 4.

The wheelbarrow body comprises a frame having rearwardly diverging side bars 1 terminating at the rear in handles 2 projecting from the rear end of the frame, legs 3 extending down from the rear end, barrow bracket 4 extending up and down across the side bars at the front, a front board 5, head bar 6 above the brackets 4, a bottom bar 7 below the frame and stay rods 8 spaced apart from the head board 5 at each end thereof to provide sockets 9 to receive the front ends of side boards 10, which are of the customary construction, provided with the cleats 11 terminating in tenons 12 that are inserted in the seats 13 on the wheelbarrow frame.

There are two of the brackets 4 as shown in the drawing and the same are attached through their faces above their bottom edges to the forward extensions 14 of the side bars, which at the rear ends form the handles 2 and intermediately form the floor supports as in the usual manner of constructing this portion of a wheelbarrow frame; there being frame cross bars 15, 16 framed in the side bars 1 and tightly clamped between said side bars by stay bolts 17, 18, that extend through from outside to outside of the side bars 1, the nuts thereof being tightly screwed home, thus making the frame perfectly rigid.

The forward brackets 4 are respectively provided with sockets consisting of an upper socket 19 and a lower slot 20 in the former of which spring means 21 are seated to support the front end of the wheelbarrow body, the spring means 21 being mounted on journal boxes 22 which are held in position relative to the spring by the follower stud 23. Said boxes 22 rest upon axle ends 24 that in turn are wheel supported.

The springs 21 are light helical springs of considerable amplitude of movement; so that the journal boxes 22 may rise and fall a sufficient distance to accommodate the rise of the wheel over slighter obstructions which may be in the way of the wheel in the ordinary practical use of the wheelbarrow. The slot 20 of the spring seat opens toward the longitudinal vertical mid-plane of the wheelbarrow body, and washers 26 are interposed between the hub ends and the brackets 4.

The washers are of considerable diameter, being of greater diameter than the hub 27 of the wheel so as to hold the hub from cramping and also from digging into the wooden brackets. They are loose on the axle and are not forced to revolve with the wheel. They span the slot 20 and slide freely on the inner faces of the brackets. They have a central bore 28 loosely fitting the axle.

The brackets 4 in a wheelbarrow for farm and garden use may be made of two sections of plank about a scant two inches in thickness, but may be thicker or thinner as occasion, or the judgment of the constructor may determine, depending upon the strength of the wood and also upon the diameter of the springs. Said planks should be strong straight-grained wood and of sufficient length to extend down below the bars 1 several inches, thus to allow the axle 24 of the wheel a to be normally held considerably below the level of the forward extension of side bars 1. Said brackets are of a general triangular shape and the spring socket 19 is formed by boring a ¾ inch hole from the lower edge of the bracket diagonal with the plane of the side bars to beyond the top of the side bar 1, so that when the helical spring 21 is inserted into said socket 19 it will loosely fit and will be fully accommodated therein.

About one-half of the wall of the socket on the inner side of each bracket is cut away to form the slots 20 in which the axle ends 24 operate. The brackets 4 are fastened above their lower edges to the forward extensions 14 of the side bars by bolts 29 and 30, the bolts 29 being arranged in a line along the side bars and the bolts 30 being smaller and arranged in a transverse line so that they prevent the front edge of the bracket from splitting off and also strengthen the front end of the side bars.

The bracket brace 31 is framed into the brackets 4 about a quarter of an inch as indicated in Fig. 3 and a bracket brace rod 32 extends through the brackets 4 and through the brace 31 from end to end thereof, tightly clamping the brackets against the brace.

When the brackets have thus been mounted and braced, the floor board 33 secured in place, the front boards 5 clamped thereon by the head 6 and stay rods 8 and secured to the brackets 4 by the screws b, the barrow may be turned upside down and the springs 21 inserted into the sockets 19. The journal boxes 22 are then laid on the ends of the springs with the follower pins 23 inserted inside the spring. The washers 26 are placed upon the axle ends 24 and said axle ends are inserted into the slots 20. Then an angle iron 34 that fits the acute front lower angle of the brackets 4 is fastened in place on said brackets by screws 35.

To complete the wheelbarrow the legs 3 are properly secured in place and the floor boards 36 are fastened in any suitable way as by screws or nails 37.

It is to be noted that by this construction the front end of the wheelbarrow floor is raised to a level considerably above the level of the axle 24, so that the thrust of the operator upon the handles will be more nearly along the line of travel of the load.

The socket bars are sufficiently deep to accommodate a helical spring which will at one and the same time support a heavy load without being fully compressed and will also readily yield to allow the wheel to pass over small obstructions. The top of the slot 20 forms a stop 38 for the axle 24, so that the spring will not be too greatly compressed by overloading.

The angle irons 34 retain the axle in place and also strengthen the bracket structure.

In practical operation the operator uses the handles the same as heretofore, but the bottom of the load is considerably above the level of the axle 24. The sockets are bored aslant rearwardly and upwardly from the lower edges of the wings and on a plane with their faces the side bars when the wheelbarrow is at rest as shown in Figs. 1 and 4, so that when the handles are lifted, the axis of the springs will be nearly vertical. As the barrow is trundled forward, the momentum of the load, not shown, tends forwardly in a horizontal line, and when an obstruction of the wheel is encountered the wheel will be forced upward by the resolution of forces and will rise over the obstacle, while the load will be but little, if any, deflected from its horizontal course. As a result of this the propulsion of the wheelbarrow is much less laborious than in any former construction.

The vertically moving axle 24 may be supported by various constructions and in Fig. 5 an anti-friction construction is shown in which the wheel hub 27 carries antifriction balls 40 in a raceway formed by the end of the hub and by a cup 41 which is screwed onto the end of said hub. A felt washer 42 is compressed by a cap 43 against the cup 41 to close the orifice between the cup 41 and the axle 24 which is supported by the antifriction balls 40. The cap 43 contacts with the washer 26, and lateral play of the wheel is thus prevented; the axle simply moving up and down in the ways 20 formed in the brackets.

The floating axle 24 may or may not be supported by ball bearings. In the form shown in Fig. 5 an oil chamber 44 inside the hub 27 surrounds the axle 27 and communication therewith is provided for by an oil hole 45 closed by a dust-cap 46.

I claim:

1. In a wheelbarrow the combination with a frame, of a front wall at the front of the frame, a head bar at the top of the front wall, a foot bar under the frame, brackets connected above their lower edges to the frame and engaged by the head bar and the front wall and clamping means adapted to clamp the head bar upon the front wall and brackets and the foot bar against the frame.

2. The combination with a wheelbarrow frame comprising side bars, a front board and a front wheel, of plank sections forming brackets fastened above their bottom edges to said side bars and by one edge to the front board and provided with bores to form sockets extending from the lower edges of the bracket members up, and having the inside walls of said bores slotted to accommodate the axle ends, helical springs in said bores, bearings carrying the springs and mounted on the axle ends, and a wheel supporting the axle ends.

3. In combination with a wheelbarrow frame having side bars and forward extensions of the side bars; bracket sections fastened to said side bars and provided with bores, and also provided with slots at the lower ends of said bores; springs in said bores; an axle moving in the slots and carrying the springs; angle irons secured around the lower corners of the plank sections respectively, adapted to close the ends of the slots to retain the axle; and a wheel carrying said axle.

4. A wheelbarrow body, side bars extending in front of the body, a wheel between the side bars, triangular bracing bodies secured above their lower edges to the side bars and by their rear edges to the front of the barrow body, said bracing body being provided with sockets bored forward slantingly and upwardly from the bottom edge of the bracing bodies, and also provided with openings extending from the lower part of the said sockets through the inner faces of the bracing bodies and forming ways for a wheel axle below the side bars; and compression springs in the sockets.

In testimony whereof, I have hereunto set my hand at Los Angeles, California, this 18th day of September, 1917.

H. W. MONTGOMERY.

Witness:
JAMES R. TOWNSEND.